(12) United States Patent
Anderson et al.

(10) Patent No.: US 11,202,533 B2
(45) Date of Patent: Dec. 21, 2021

(54) FOOD PREPARATION APPARATUS AND METHOD FOR USE

(71) Applicant: Vivid Robotics, Inc., Seattle, WA (US)

(72) Inventors: Colton Anderson, Seattle, WA (US); Brian Michael De Vitis, Kirkland, WA (US); Kyu Sung Han, Seattle, WA (US); Emmett Walter Lalish, Seattle, WA (US); Garett Ochs, Seattle, WA (US); Kort Edward Reinecke, Seattle, WA (US); Cole Clark Rogers, Seattle, WA (US); Derek David Soike, Seattle, WA (US); Nicholas Alan Halverson Spada, Seattle, WA (US); Sage Paladeni Van Tilburg, Vancover, WA (US); Andrea Margaret Willson, Seattle, WA (US); Clayton Wood, Seattle, WA (US); Nicholaus Clarendon Wright, Seattle, WA (US); Shiyu Xia, Seattle, WA (US)

(73) Assignee: Picnic Works, Inc., Seattle, WA (US)

( * ) Notice: Subject to any disclaimer, the term of this patent is extended or adjusted under 35 U.S.C. 154(b) by 0 days.

(21) Appl. No.: 16/360,487

(22) Filed: Mar. 21, 2019

(65) Prior Publication Data

US 2020/0297164 A1 Sep. 24, 2020

(51) Int. Cl.
*A47J 37/12* (2006.01)

(52) U.S. Cl.
CPC .................. *A47J 37/1228* (2013.01)

(58) Field of Classification Search
CPC .......... A47J 37/1228; A21C 9/00; A21C 9/02; A21C 9/04; A21C 9/08; A21D 13/41; B65G 47/00; B65G 47/02

USPC ....... 99/324, 485, 450.1, 494; 426/289, 292; 198/812, 813, 815, 594, 588, 345.2, 339.1
See application file for complete search history.

(56) References Cited

U.S. PATENT DOCUMENTS

| | | | | |
|---|---|---|---|---|
| 4,152,976 A | * | 5/1979 | Kawasaki | A21C 9/04 177/120 |
| 4,264,634 A | * | 4/1981 | Hochandel | A23P 20/12 426/289 |
| 2008/0187637 A1 | * | 8/2008 | Spiegel | A21C 9/04 426/383 |
| 2014/0050825 A1 | * | 2/2014 | van Blokland | A21C 9/04 426/231 |
| 2017/0290345 A1 | * | 10/2017 | Garden | A21B 7/00 |
| 2019/0125126 A1 | * | 5/2019 | Cohen | A47J 36/32 |

FOREIGN PATENT DOCUMENTS

JP 2013156072 A * 8/2013

\* cited by examiner

*Primary Examiner* — Tu B Hoang
*Assistant Examiner* — Alba T Rosario-Aponte
(74) *Attorney, Agent, or Firm* — Priya Sinha Cloutier

(57) ABSTRACT

The present invention relates to apparatus and methods for assembling food products. More particularly, the invention relates to apparatus and methods for associating foodstuff and liquid with a base. Foodstuff may include food items such as meats, vegetables, cheeses, amongst others. Liquids include those food items that have a low viscosities (e.g. sauces, dressings, oils), high viscosities (e.g. peanut butter, frosting), and anything in between. A base can be anything on which foodstuff or liquid may be associated (e.g. bread, cake, cookies, pizza dough, a bowl in which to place foodstuff).

6 Claims, 17 Drawing Sheets

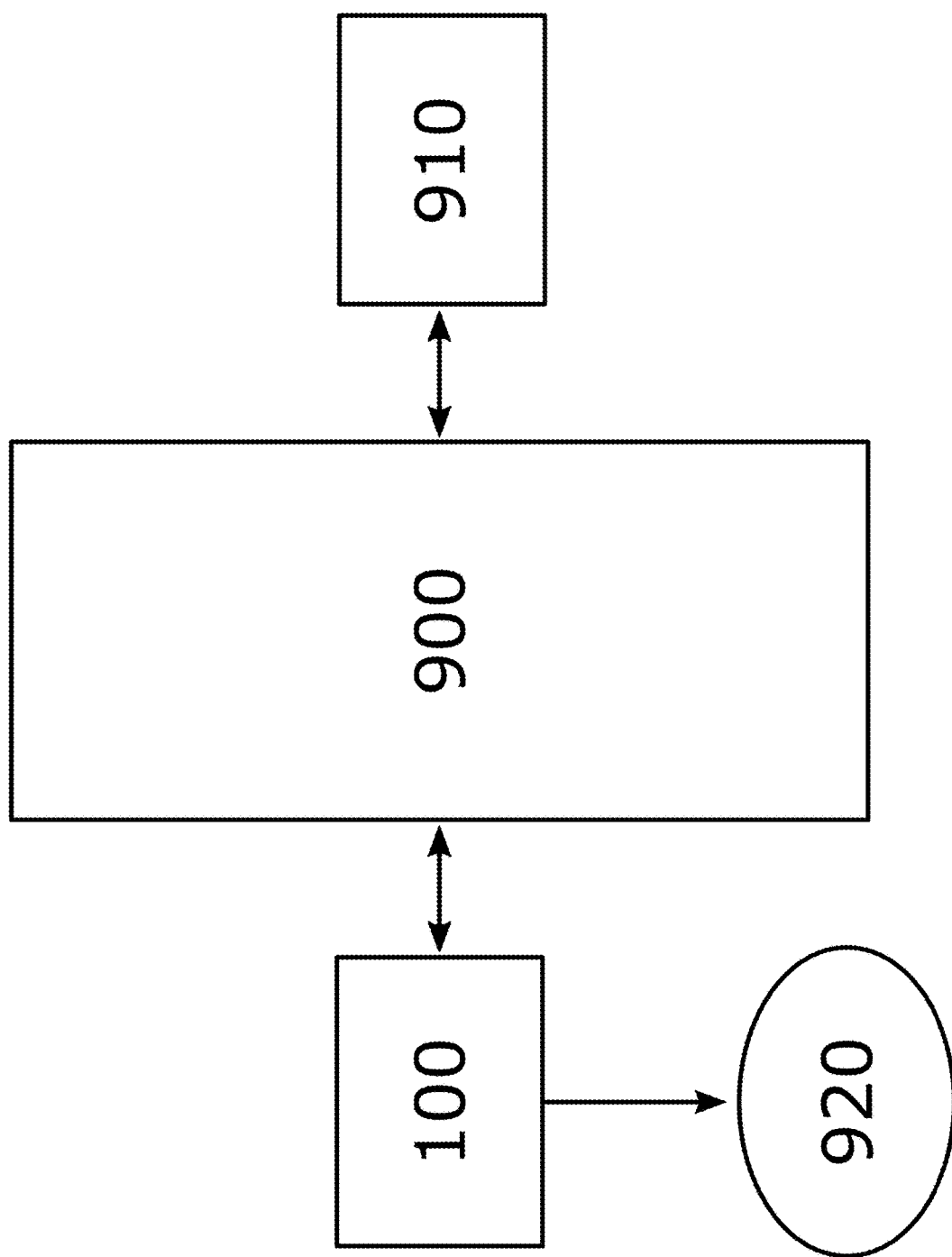

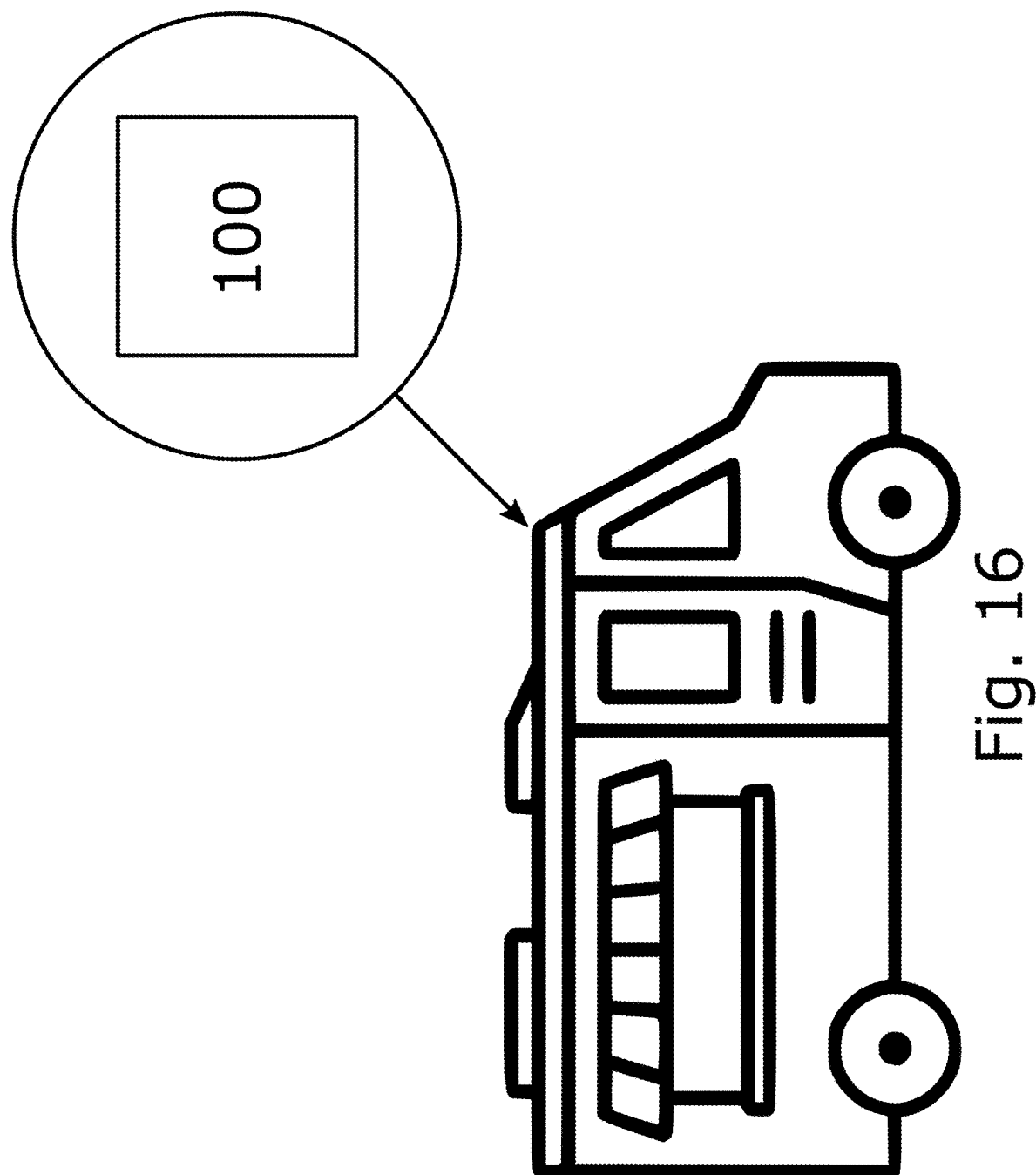

FOOD PREPARATION APPARATUS AND METHOD FOR USE

CROSS-REFERENCES TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND

The present invention relates to apparatus and methods for assembling food products. More particularly, the invention relates to apparatus and methods for associating foodstuff and liquid with a base. Foodstuff may include food items such as meats, vegetables, cheeses, amongst others. Liquids include those food items that have low viscosities (e.g. sauces, dressings, oils), high viscosities (e.g. peanut butter, frosting), and anything in between. A base can be anything on which foodstuff or liquid may be associated (e.g. bread, cake, cookies, pizza dough, a bowl in which to place foodstuff).

In a commercial kitchens, the process of associating foodstuff to a base is labor intensive and expensive. Consider, for example, assembling a pizza. Pizza dough must be prepped and formed into the correct size base and a specified amount of sauce and bulk ingredients (e.g. mushrooms, olive, pepperoni, green peppers, amongst others) must be applied to the base.

The application of a specified amount of sauce and bulk ingredient is important for a few of reasons. First, a specified amount of sauce and bulk ingredients allows diners to have a consistent experience. If, for a cheese pizza, for example, a three to one cheese to sauce ratio provides the best dining experience, then each time that pizza is ordered the three to one ratio should be used. Second, the amount of sauce and bulk ingredients delivered to a base will determine the profit margin for a pizza. If too much sauce and bulk ingredients are delivered to a base, profit margins will be lower or lost. If too little sauce and bulk ingredients are delivered to a base, customers may be lost. In both of these scenarios, tolerance for error is low.

There is a need for a fully automated, easy to operate, apparatus which consistently, associates foodstuff and liquid with a base. Such an apparatus may be used as an operator-assisted, vending machine; diner operated, stand-alone vending machine, which may be used on campuses, cafeterias, commissaries, etc.; a kitchen operated machine which can be operated by a cook, for example; amongst others.

BRIEF DESCRIPTION OF INVENTION

A general object of the invention is to provide an automated, self-contained apparatus which will associate foodstuff with a base.

Another object of the invention is to provide improved dispensing assemblies for associating selected quantities of at least one foodstuff and/or liquid from a plurality of foodstuffs and/or liquids to at least one base.

Another object of the invention is to provide a liquid dispensing apparatus that effectively distributes liquid over a base.

Another object of the invention is to provide a foodstuff dispensing apparatus that effectively distributes foodstuff onto a base.

Another object of the invention is to provide an apparatus in which foodstuff and/or liquid may be preselected by a diner and cooked an amount which is dependent upon the selected foodstuff and/or base.

DESCRIPTION OF THE SEVERAL VIEWS OF THE DRAWINGS

Other features and advantages of the present invention will become apparent in the following detailed descriptions of the preferred embodiment with reference to the accompanying drawing.

FIG. 15 is a flow chart showing an embodiment of a control system for the apparatus for a self-contained system to associate foodstuff and/or liquid with a base;

FIG. 16 shows a vehicle is which the apparatus for a self-contained system to associate foodstuff and/or liquid with a base is located.

DETAILED DESCRIPTION OF THE INVENTION

Figure 1A:
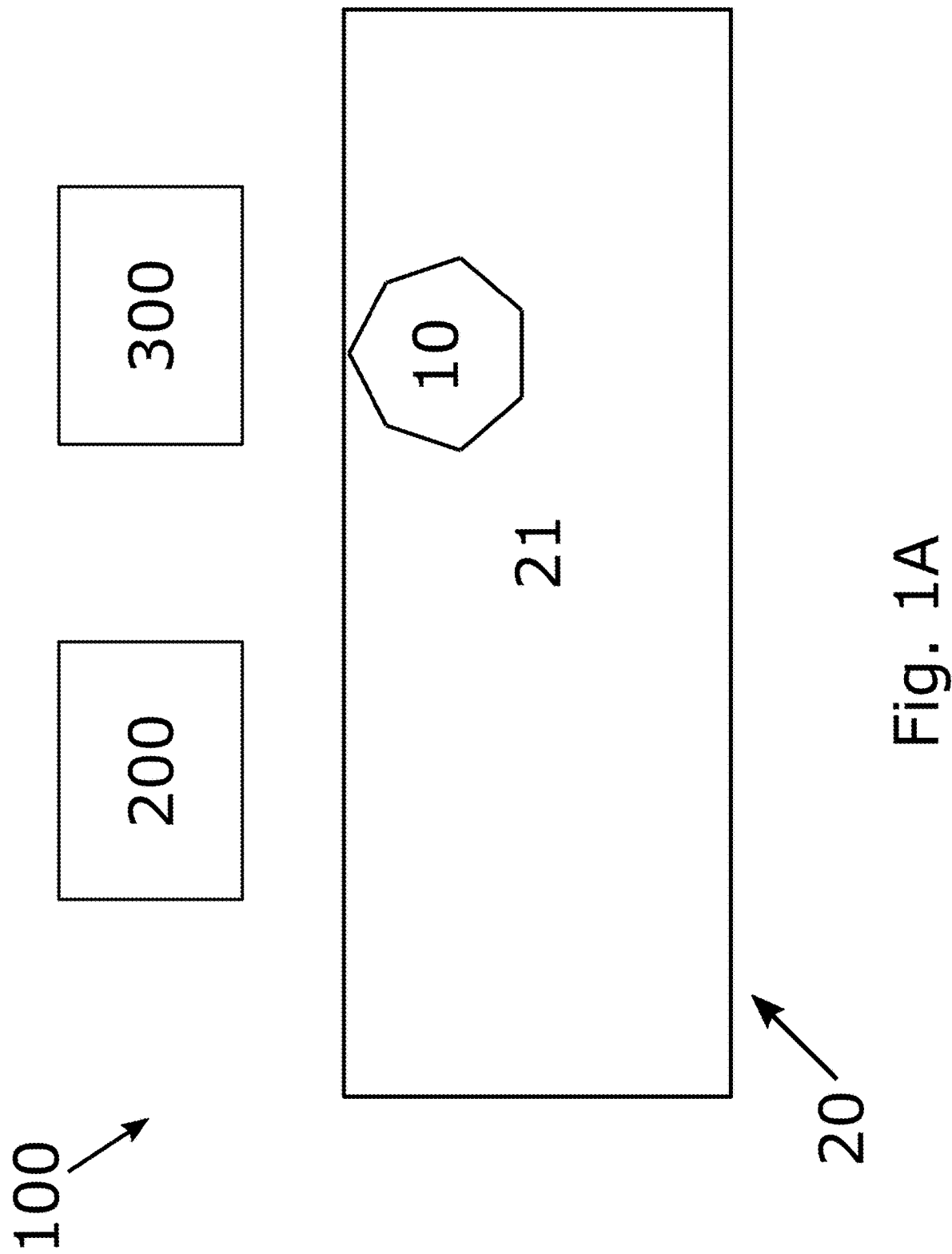
FIG. 1A is a block diagram of an embodiment of apparatus for a self-contained system to associate foodstuff and/or liquid with a base.

In the following detailed description, reference is made to the accompanying drawings, which form a part hereof. In the drawings, the use of similar or the same symbols in different drawings typically indicates similar or identical items, unless context dictates otherwise.

The illustrative embodiments described in the detailed description, drawings, and claims are not meant to be limiting. Other embodiments may be utilized, and other changes may be made, without departing from the spirit or scope of the subject matter presented here.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

The present application uses formal outline headings for clarity of presentation. However, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, the use of the formal outline headings is not intended to be in any way limiting. Given by way of overview, illustrative embodiments include apparatus for a self-contained system to associate of foodstuff and/or liquid with a base ("apparatus") (100) and methods.

In one example, the base may be bread and the liquid may include a condiment, and the foodstuff maybe deli meat. In another example, the base may be a cookie and the liquid may be frosting. In another example, the base may be a bowl and the foodstuff may be greens for a salad and the liquid may be a salad dressing. Exemplary embodiments discussed below describe the assembly of pizza.

In the following specifications, reference will be made to conveyor belt systems. Generally, as used herein, a conveyor belt system is comprised of at least two pulleys, with an endless loop of carrying medium—the conveyor belt—that is rotated by pulleys. One or both of the pulleys are powered moving the belt and the material on the belt in a defined direction. The powered pulley is called the drive pulley while the unpowered pulley is called the idler pulley. Generally, the powered pulley is motor driven. The motor may be an electric motor, air motor, hydraulic motor, amongst others.

Referring to FIG. 1A, in an embodiment, the apparatus (100) is comprised of a main conveyor belt system (20) having at least one conveyor belt (21) and at least one distribution station chosen from the set consisting of a liquid distribution station (200) and a non-liquid (or foodstuff) distribution station (300). Although two distribution stations (200, 300) are shown, it will be obvious that the apparatus (100) may have any number of distribution stations in any combination. In embodiments, bases (10) are sequentially loaded onto the of the main conveyer belt (21). The bases (10) are conveyed through at least one distribution station (200, 300) in which foodstuff and/or liquid is associated with the bases (10).

In an embodiment, the main conveyer belt system (20) is comprised of a single conveyor passing beneath each distribution station (200, 300). In another embodiment, the main conveyor belt system (20) may be comprised of several interconnected conveyor sections.

Referring to FIGS. 2 through 5, in an embodiment, the liquid distribution system (200) is comprised of at least one set of liquid distribution tracks (210) and at least one conduit (220) that provides liquid to at least one liquid distribution nozzle (230). In an embodiment, the conduit (220) is in fluid communication with a container (not shown) that holds the liquid that is to be associated with a base. In an embodiment, a pumping mechanism (222) moves fluid from the container through the conduit (220) into the liquid distribution nozzle (230). In an embodiment, the pumping mechanism (222) is a peristaltic pump.

The liquid distribution nozzle (230) is operably connected to the liquid distribution tracks (210) so as to allow movement of the liquid distribution nozzle (230) along the liquid distribution tracks (210). The liquid distribution nozzle (230) is operably connected to a motorized pulley system (240) which enables the movement of the liquid distribution nozzle (230) along the liquid distribution tracks (210).

According to an embodiment, the liquid distribution nozzle (230) is supported by a frame (235). The frame (235) is operably mated to the liquid distribution tracks (210). According to an embodiment, the frame (235) is operably connected to a motorized pulley system (240) which enables movement of the liquid distribution nozzle (230) along the distribution tracks (210).

According to an embodiment, the liquid distribution tracks (210) are configured to lie approximately perpendicular to the main conveyor belt system (20). According to an embodiment, the movement of the liquid distribution nozzle (230) is timed so that when the conveyor moves a base (10) underneath the liquid distribution station (200) the liquid distribution nozzle (230) moves from a first location (211) on the liquid distribution tracks (210) to a second location (212) on the liquid distribution tracks (210) to associate liquid with the base (10). According to an embodiment, the liquid distribution nozzle (230) may travel from more than one first location (211) to more than one second (212) location on the liquid distribution tracks (210) as the base (10) is conveyed under the liquid distribution station.

According to an embodiment, the liquid distribution nozzle (230) moves from a first location to a second location on the liquid distribution tracks (210) to deposit liquid based upon the size or location of the base (10) or the type of liquid to be distributed over a base (10). According to an embodiment, the movement of the liquid distribution nozzle (230) is controlled by computer numerical control or other software that provides a similar function.

According to an embodiment, the liquid distribution nozzle (230) distributes liquid while moving in one direction along the liquid distribution tracks (210). That is, liquid is distributed while moving from a first location to a second location; or liquid is distributed while moving from a second location to a first location.

Figure 6:
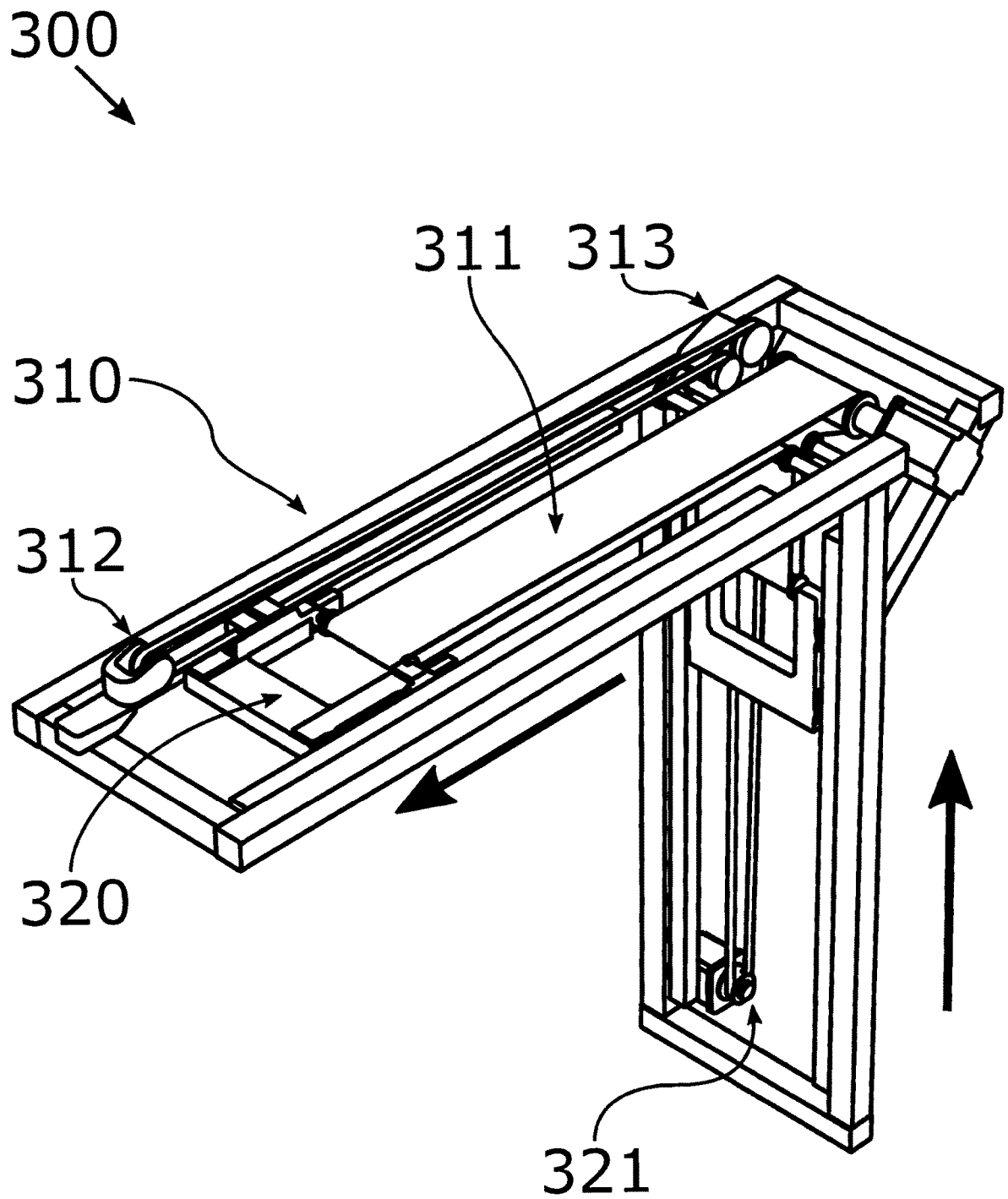
FIG. 6 is a perspective view of an embodiment of the foodstuff distribution station.
Figure 7:
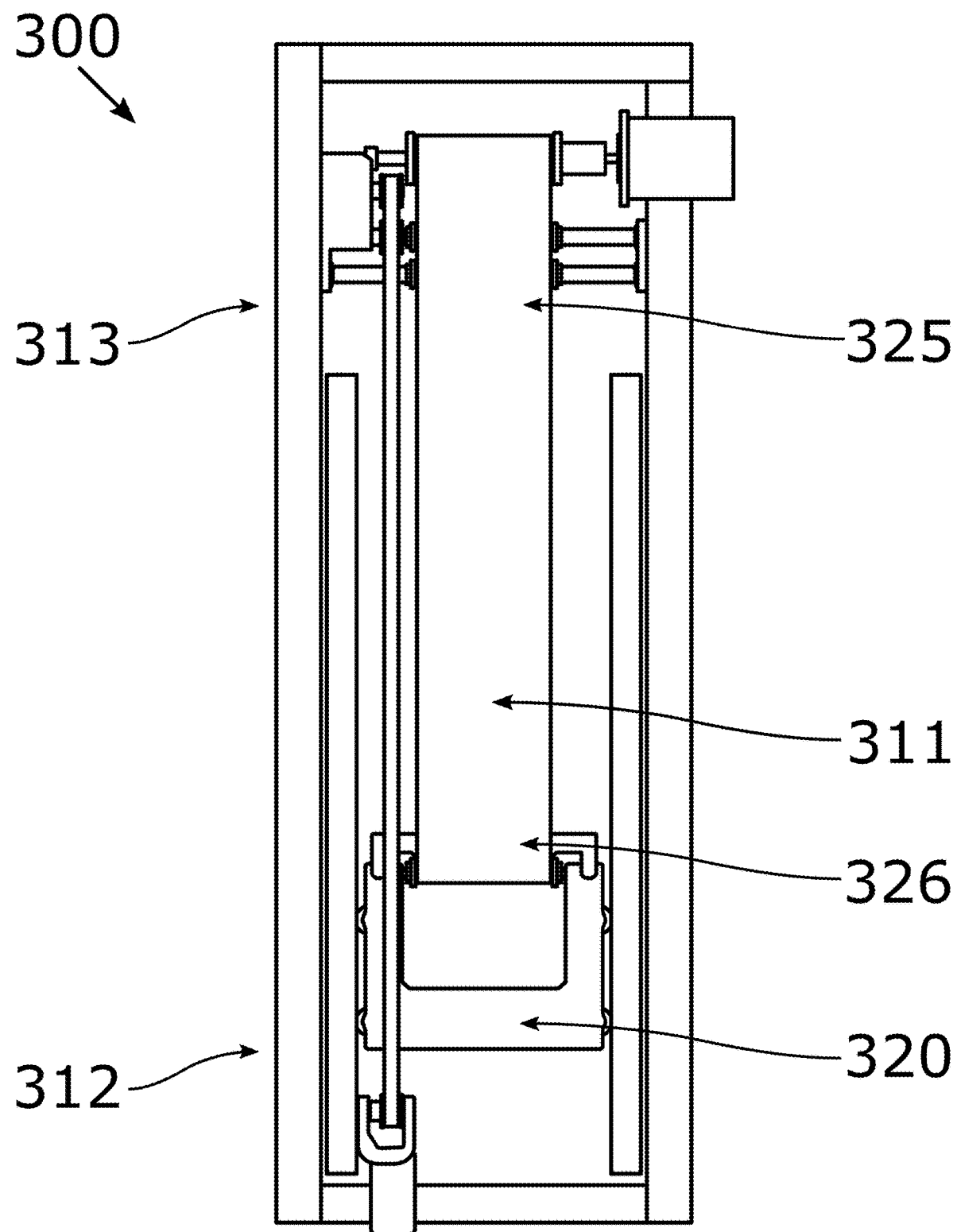
FIG. 7 is a top view of an embodiment of the foodstuff distribution station.

Referring to FIGS. 6 and 7, non-liquid foodstuff may be associated with a base (10) using a foodstuff distribution station (300). According to an embodiment the foodstuff distribution station (300) is comprised of a foodstuff conveyor belt system (310) having at least one food stuff conveyor belt (311) and a carriage (320). The carriage (320) is comprised of a motor and pully system (321) allowing it to move from a first location (313) to a second location (312).

The foodstuff conveyor belt (311) is comprised of a near end (325) and a far end (326). The foodstuff conveyor belt (311) is operably attached to the carriage (320) so that when the carriage (320) moves from a first location (313) to a second location (312) the foodstuff conveyor belt (311)

moves from the first location (313) to the second location (312) while continuing to rotate around its pulleys. According to one embodiment, when the carriage (320) moves from the second location (312) to the first location (313), the foodstuff conveyor belt (311) is locked so that it is no longer rotating around its pulleys. In another embodiment, when the conveyor belt (311) moves from the first location (313) to the second location (312) the speed of the foodstuff conveyor belt (311) is modulated. In another embodiment, when the conveyor belt (311) moves from the second location (312) to the first location (313), the speed of the foodstuff conveyor belt (311) is modulated. In another embodiment, the speed of the foodstuff conveyor belt (311) is continually modulated.

According to an embodiment, the foodstuff conveyor belt (311) is located approximately perpendicular to the main conveyor (21). According to an embodiment, as foodstuff conveyor belt (311) is timed to deliver foodstuff to a base (10) as it passes under the foodstuff conveyor system (300). According to an embodiment, the foodstuff conveyor associates foodstuff with the base (10) based upon the size or location of the base (10) or the type of foodstuff to be distributed over a base (10). According to an embodiment the movement of the foodstuff distribution station (300) is controlled by computer numerical control or other software that provides a similar function.

According to an embodiment, when the carriage (320) moves from the first location (313) to the second location (312), foodstuff is associated with the foodstuff conveyor belt (311). The carriage (320) is then moved from the second location (312) to the first location (313) and the food stuff conveyor belt (311) is prevented from rotating; consequently, foodstuff is associated with the base (10). According to an embodiment, the carriage (320) may have a plurality of first locations (313) and a plurality of second locations (312).

In one embodiment, the foodstuff conveyer belt (311) is a single conveyor. In another embodiment, the foodstuff conveyor belt (311) may be comprised of several interconnected conveyor sections.

Figure 8:
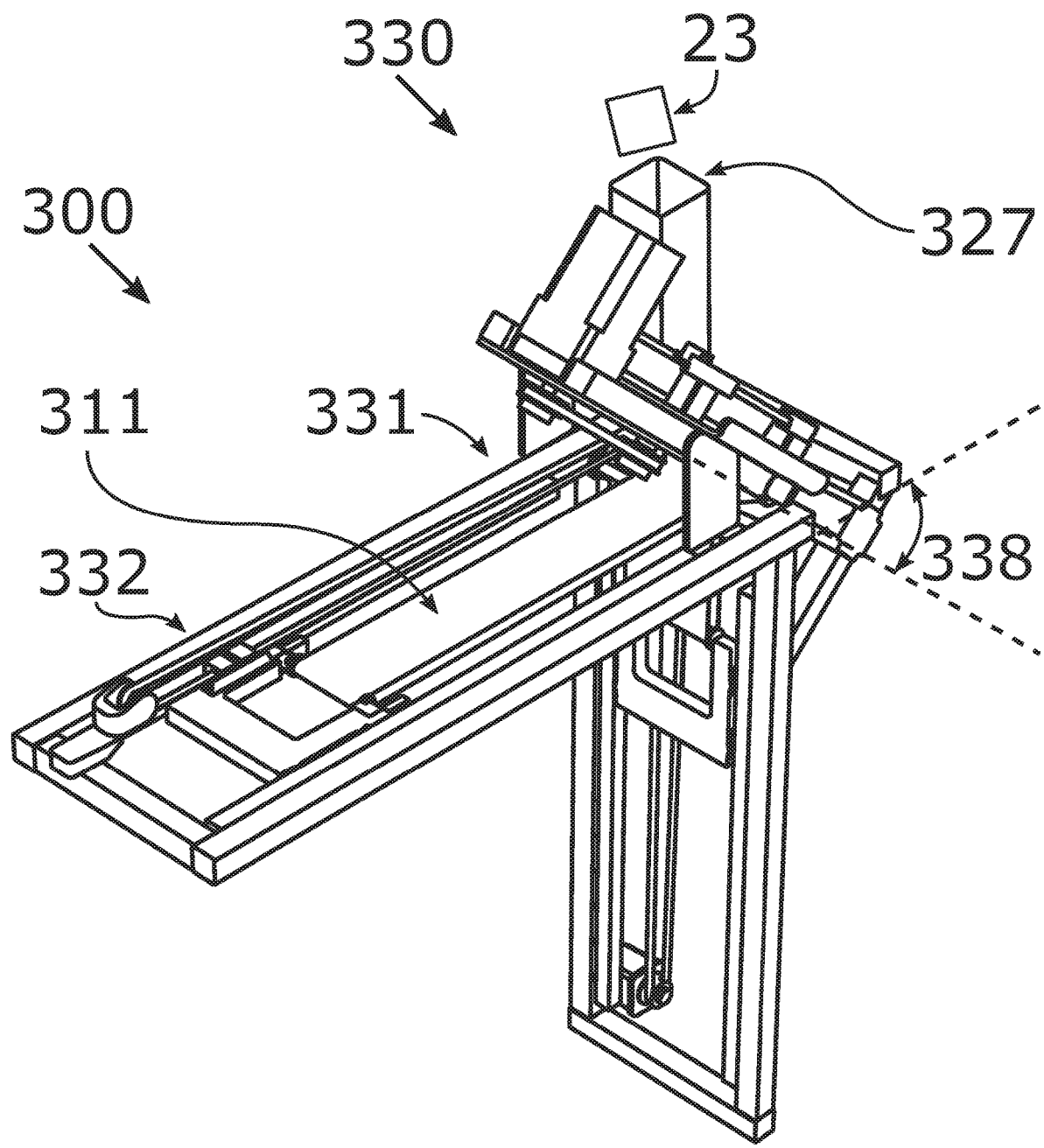
FIG. 8 is a perspective view of an embodiment of the cheese grater and distribution station.
Figure 9:
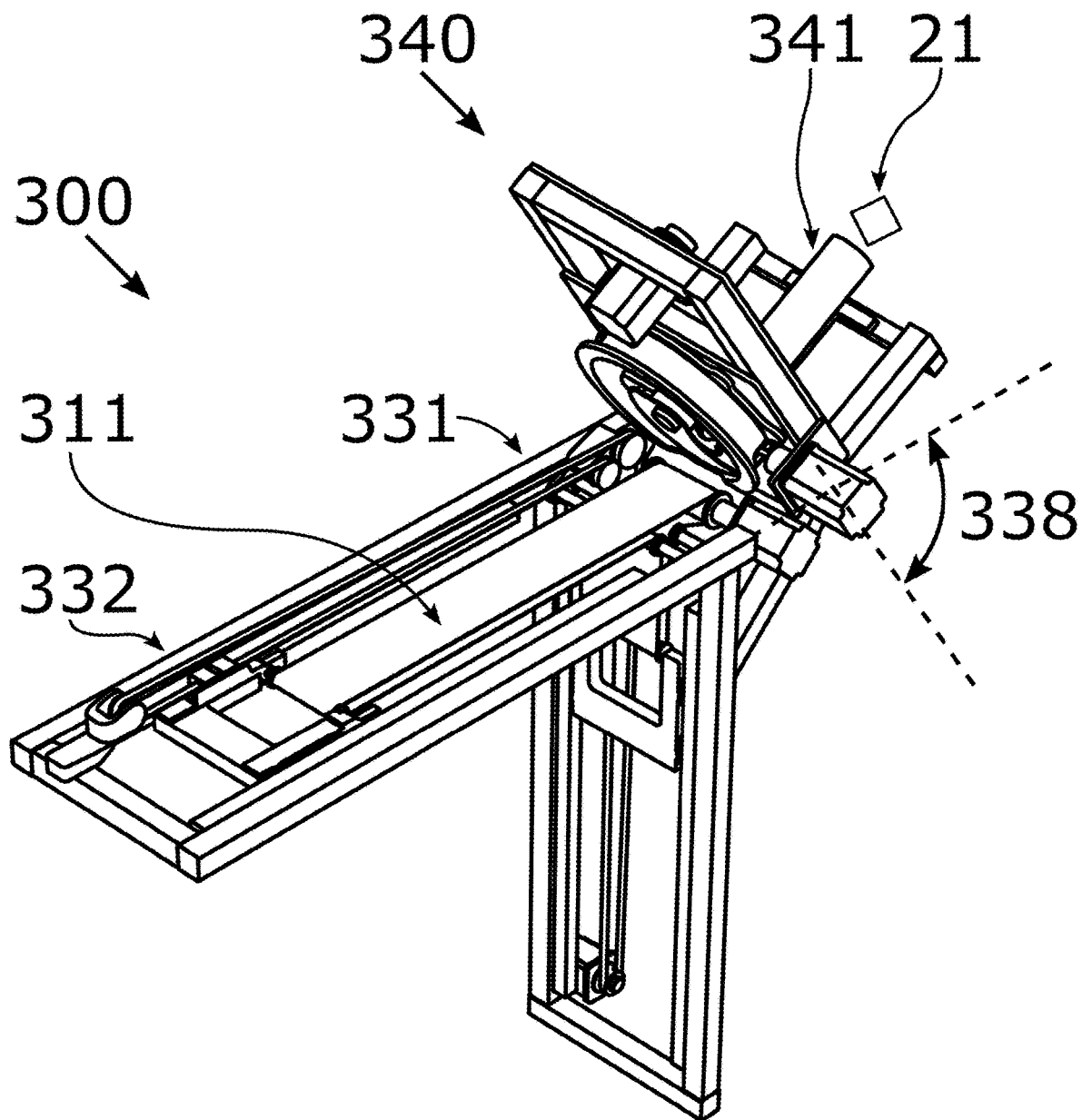
FIG. 9 is a perspective view of an embodiment of the meat slicer and distribution station.
Figure 10:
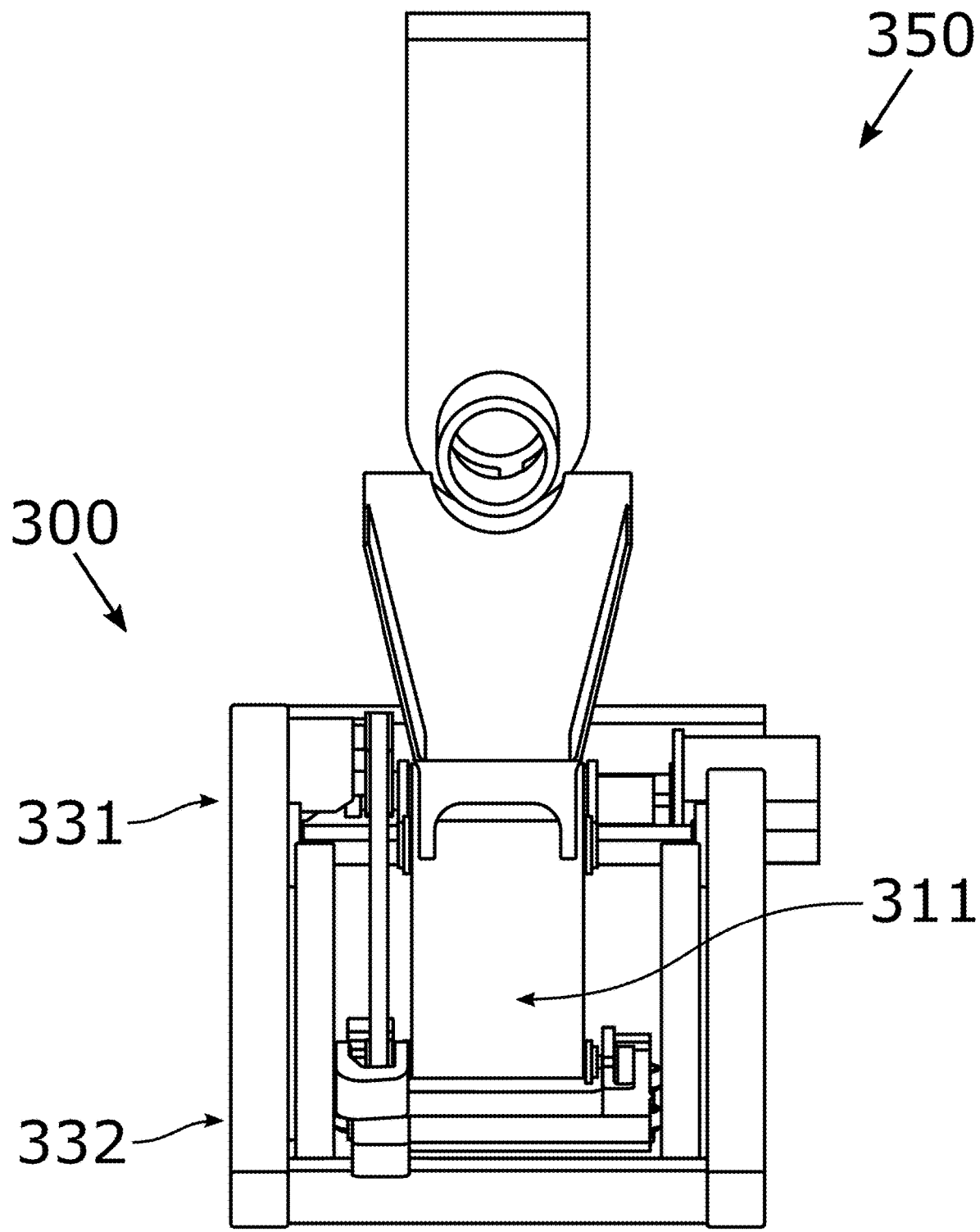
FIG. 10 is a front view of an embodiment of the granular foodstuff distribution station.
Figure 11:
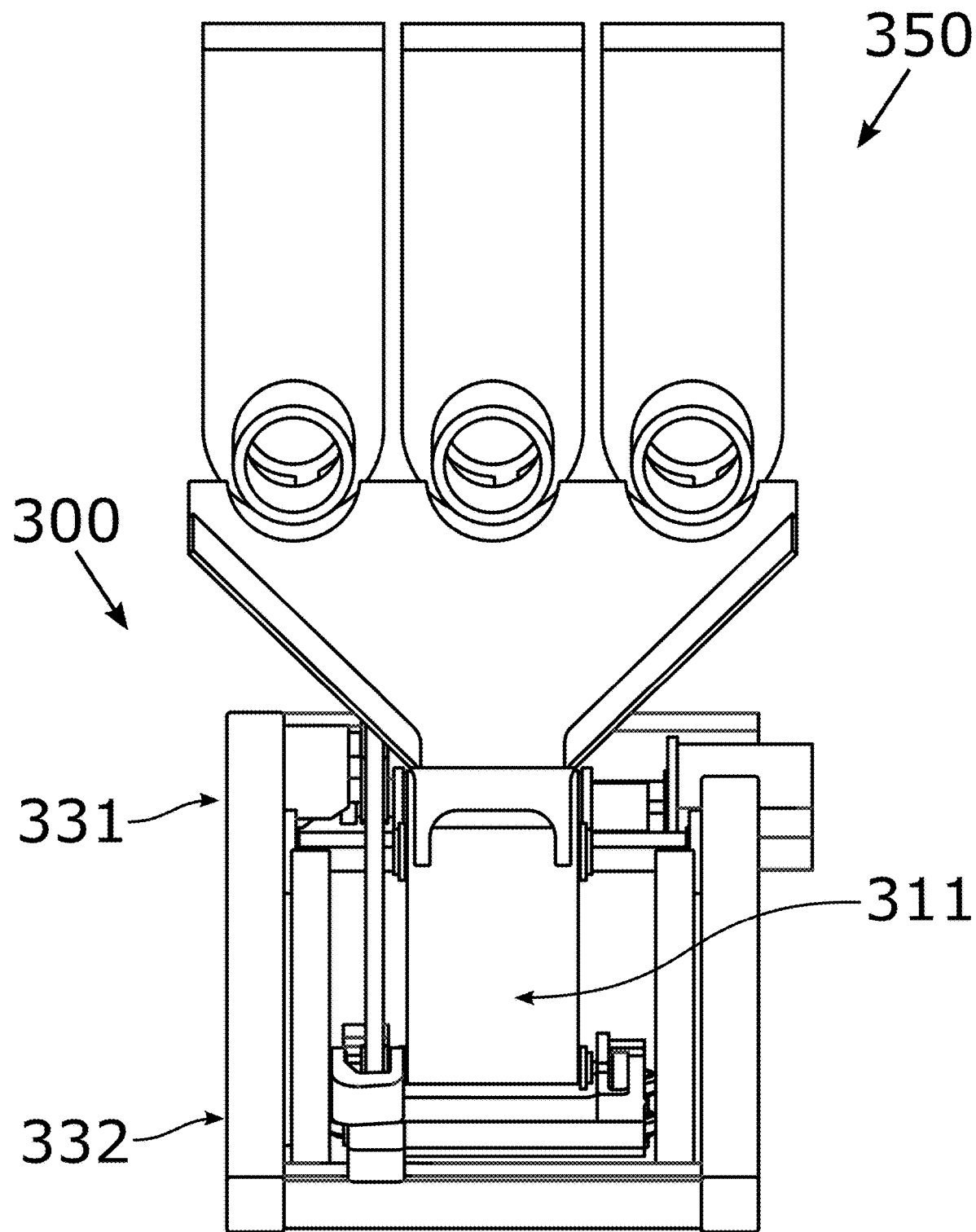
FIG. 11 is a front view of an embodiment of the granular foodstuff distribution station.
Figure 12:
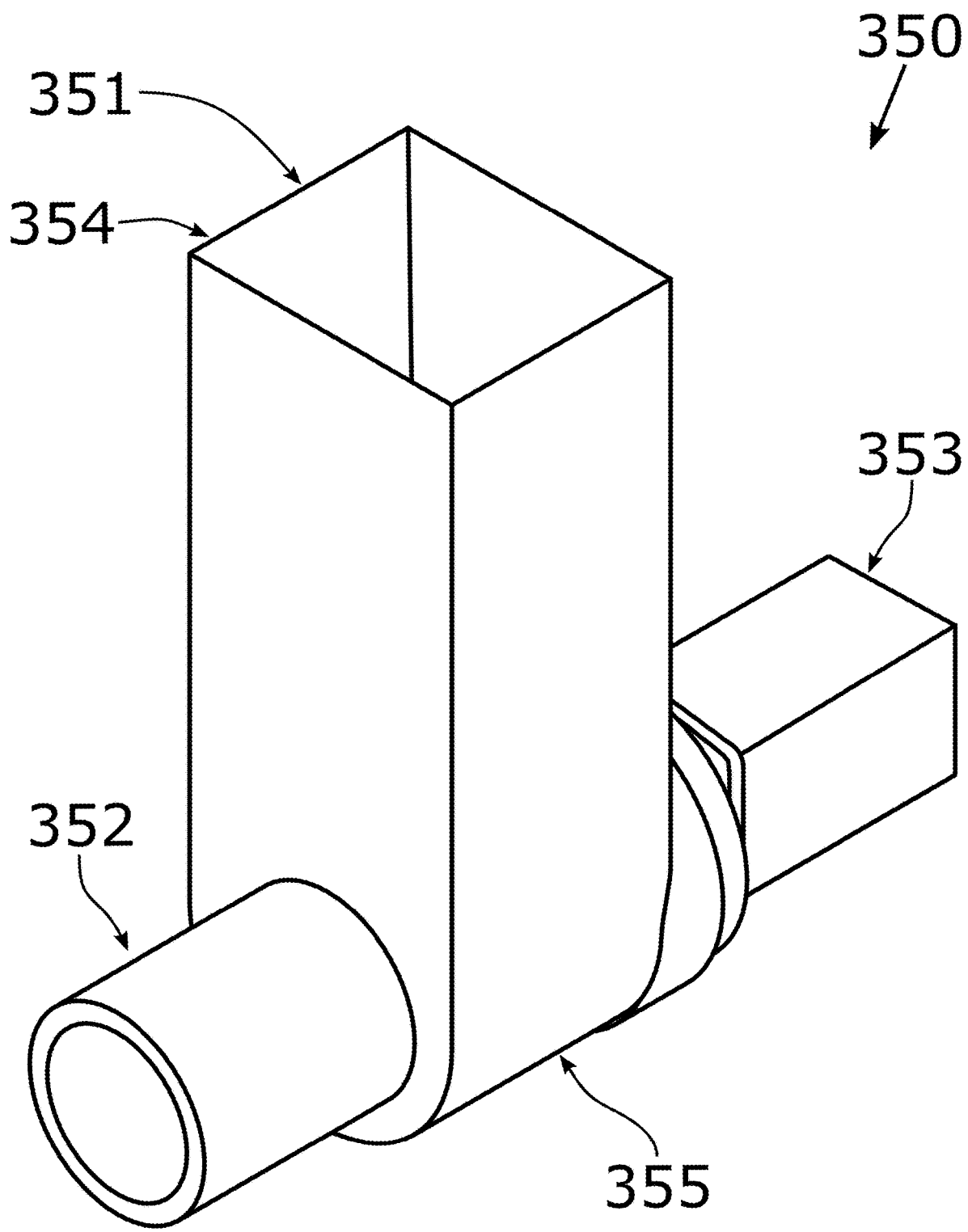
FIG. 12 is a perspective view of an embodiment of the granular foodstuff container.
Figure 13:
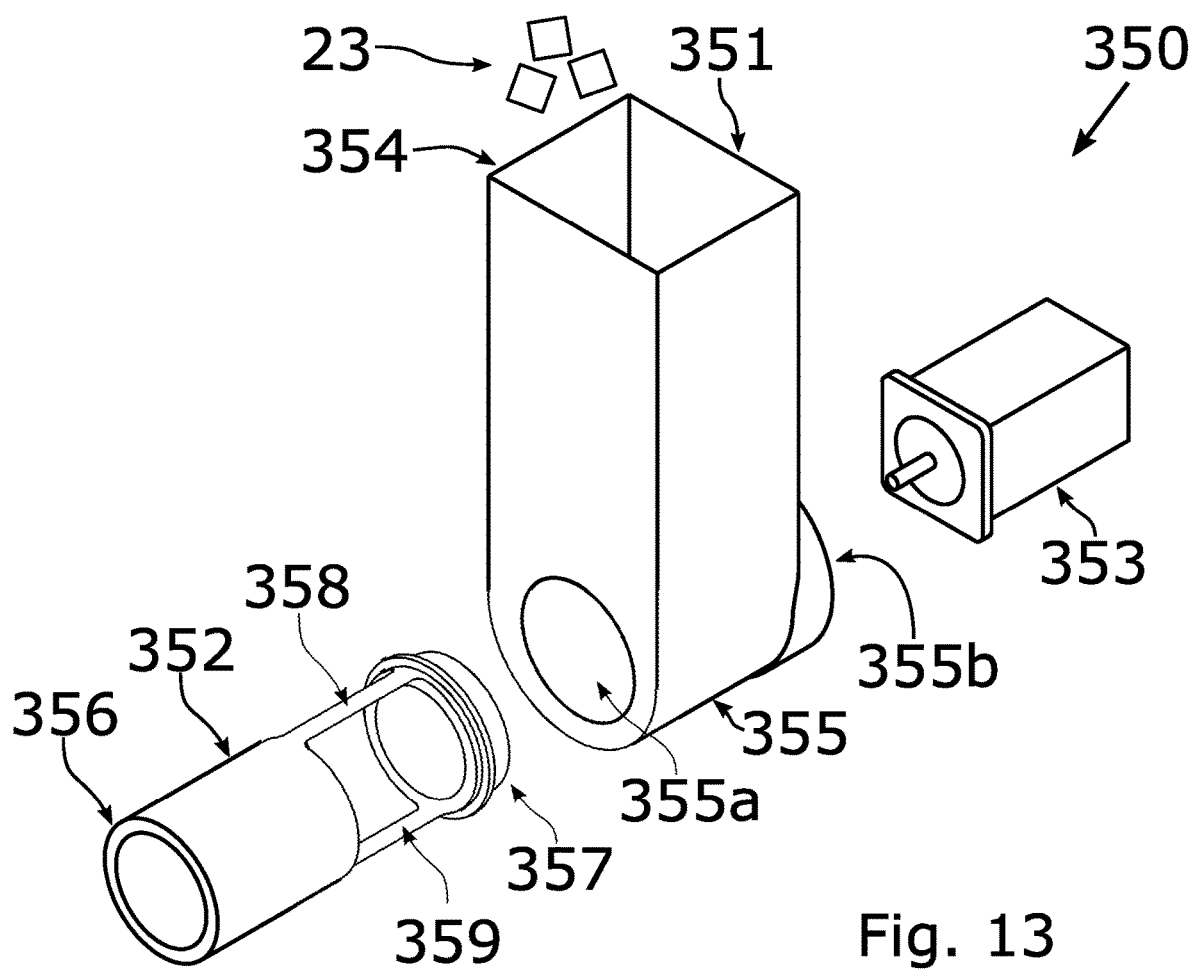
FIG. 13 is an exploded view of an embodiment of the granular foodstuff container.

Referring to FIGS. 6 through 8, according to one embodiment, the foodstuff distribution station (300) may be operably attached to a shredder (330). The foodstuff distribution station (300) has a near end (331) and a far end (332). According to an embodiment, the shredder (330) is operably attached to the near end (331) of the foodstuff distribution station (300) with a commonly known fastening system. According to one embodiment, the shredder (330) is operably attached to the near end (331) of the foodstuff distribution station (300) at an angle (338) between 10° and 90° relative to the foodstuff conveyor belt (311) which is approximately horizontal. Although a disk shredder is shown in drawings for exemplary purposes, the shredder can be any other apparatus that accepts foodstuff and associates the foodstuff to the foodstuff conveyor belt (311) in a smaller portion by slicing, dicing, or otherwise cutting the foodstuff.

Figure 1B:
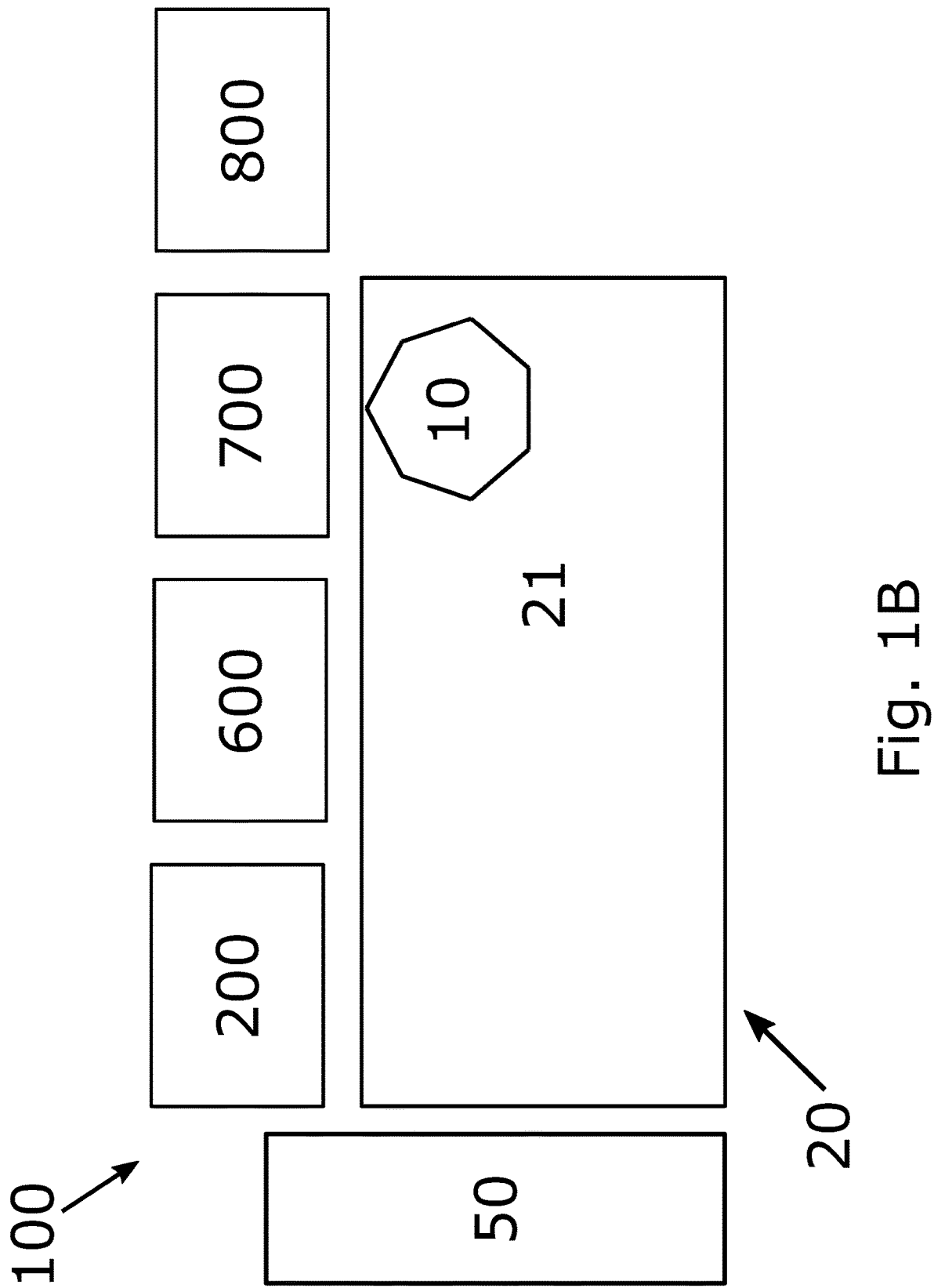
FIG. 1B is a block diagram of an embodiment of apparatus for a self-contained system to associate foodstuff and/or liquid with a base.
Figure 2:
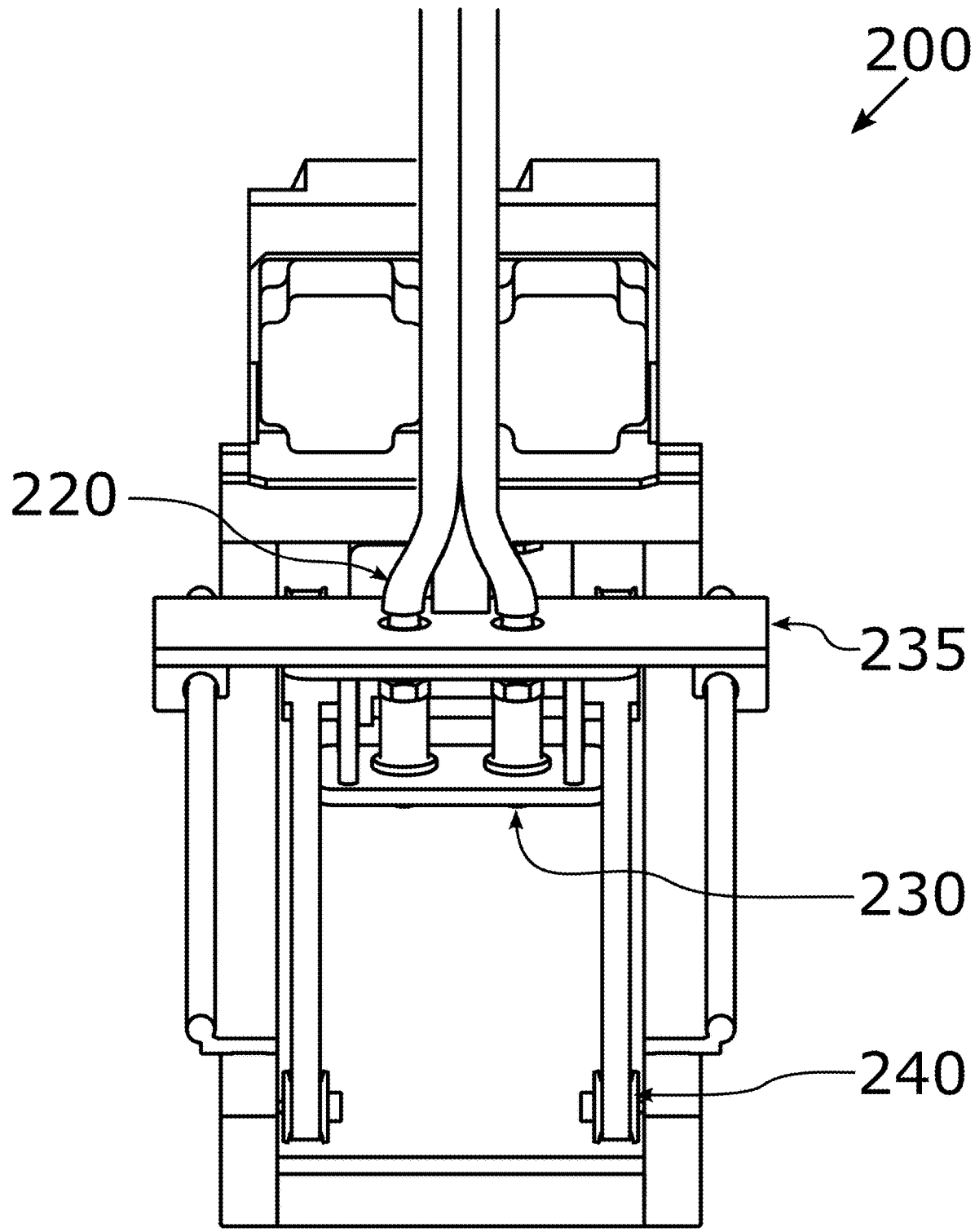
FIG. 2 is a front view of an embodiment of the liquid distribution station.
Figure 3:
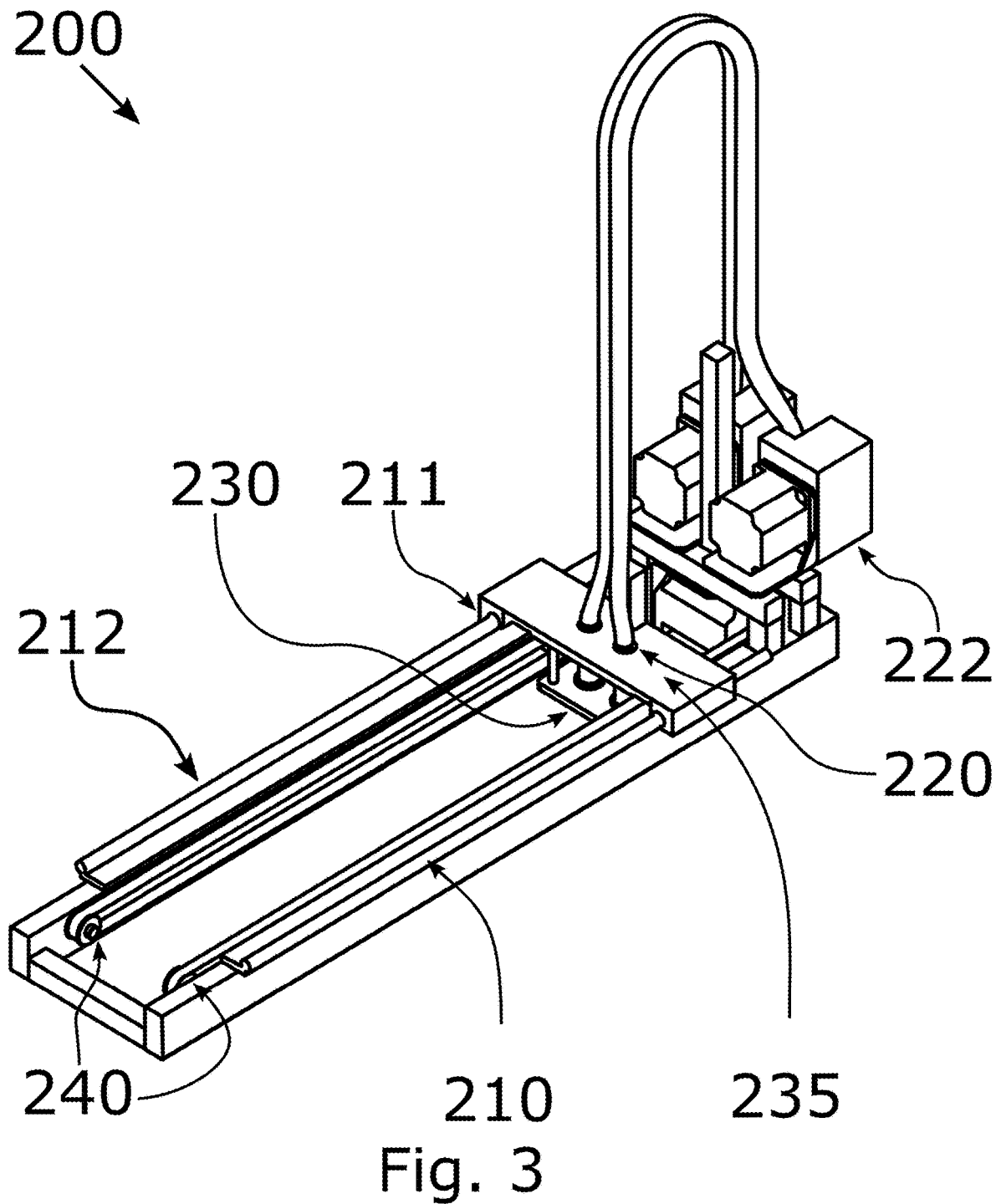
FIG. 3 is a perspective view of an embodiment of the liquid distribution station.
Figure 4:
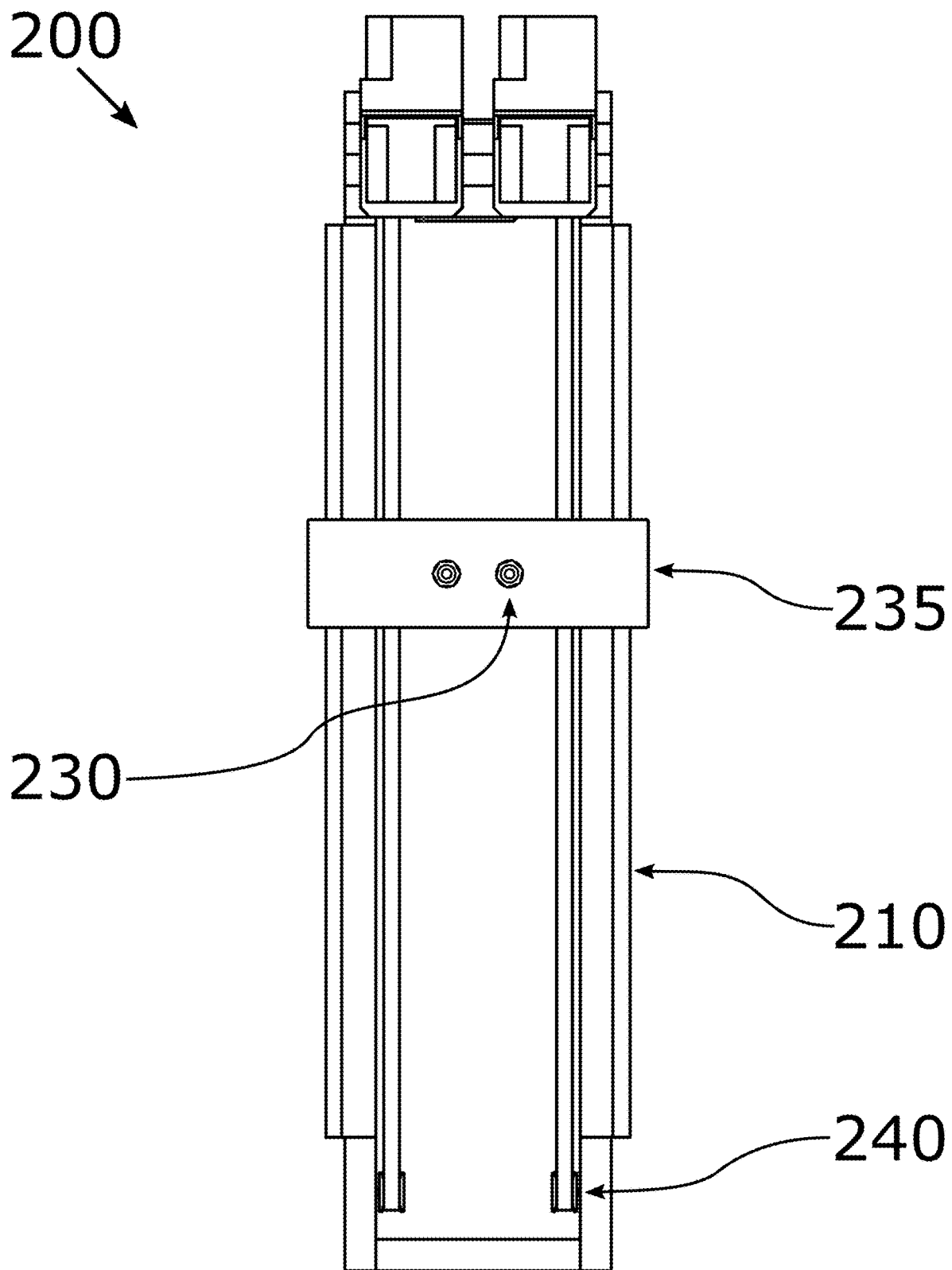
FIG. 4 is a top view of an embodiment of the liquid distribution station.
Figure 5:
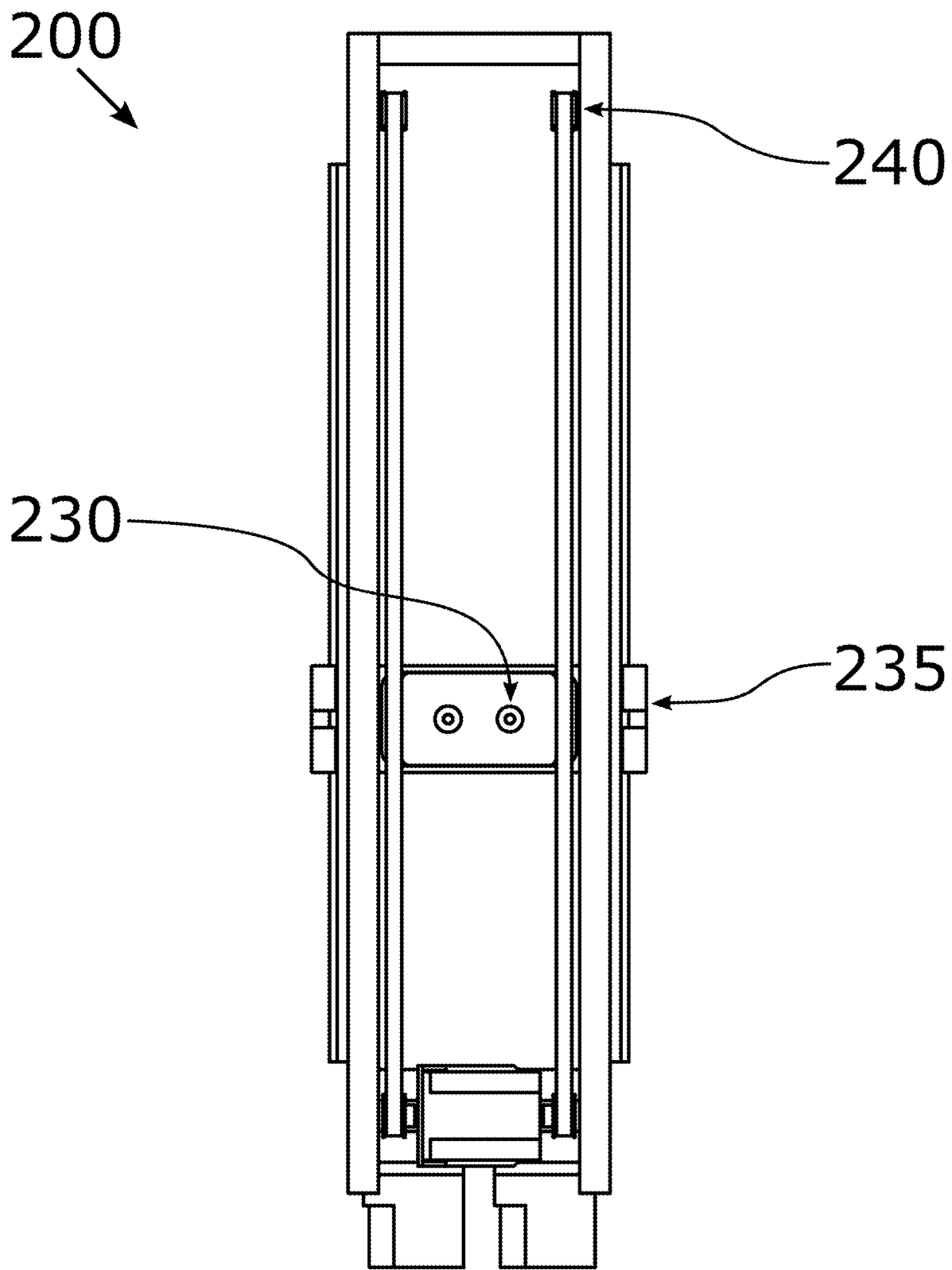
FIG. 5 is a bottom view of an embodiment of the liquid distribution station.

According to an embodiment, the shredder (330) may be cooled by an external or internal heat exchange system. According to an embodiment, a conduit (27) may be located near or operably attached to the shredder (330) or foodstuff distribution station (300) allowing delivery of foodstuff (23) to the shredder. According to an embodiment, the foodstuff (23) delivered to the shredder (330) is cheese. Referring to FIG. 1B, for exemplary purposes, this is called the cheese distribution station (600) below.

Referring to FIGS. 6, 7, 8, and 9, according to one embodiment, the foodstuff distribution station (300) may be operably attached to a slicer (340). The foodstuff distribution station (300) may have a near end (331) and a far end (332). According to an embodiment, the slicer (340) is operably attached to the near end (331) of the foodstuff distribution station (300) with a commonly known fastening system. According to one embodiment, the slicer (340) is operably attached to the near end (331) of the foodstuff distribution station (300) at an angle (338) between 10° and 90° relative to the foodstuff conveyor belt (311) which is approximately horizontal. According to an embodiment, the slicer may slice foodstuff to various thicknesses. Although a slicer is shown in drawings for exemplary purposes, the slicer (340) can be any apparatus that accepts foodstuff and associates the foodstuff to the foodstuff conveyor belt (311) in a smaller portion by slicing, dicing, or otherwise cutting the foodstuff.

According to an embodiment, the slicer (340) may be cooled by an external or internal heat exchange system. According to an embodiment, a conduit (341) may be located near or operably attached to the slicer (340) allowing delivery of foodstuff (21) to the slicer (340). According to an embodiment, the foodstuff (21) delivered to the slicer (340) is pepperoni or other meat. Referring to FIG. 1B, for exemplary purposes, this is called the meat distribution station (700) below.

Referring to FIGS. 6, 7, 8, 12, and 13, according to one embodiment, the foodstuff distribution station (300) may be operably attached to at least one foodstuff container (350). The foodstuff distribution station (300) may have a near end (331) and a far end (332). According to an embodiment, the foodstuff container (350) is operably attached to the near end (331) of the foodstuff distribution station (300) with a commonly known fastening system. According to an embodiment, the foodstuff container (350) is located at the near end (331) of the food stuff distribution station (300) allowing foodstuff from the foodstuff container (350) to associate with the foodstuff conveyor belt (311).

According to an embodiment, the foodstuff container (350) is comprised of a foodstuff conduit (351), a barrel (352), and motor (353). The foodstuff conduit (351) has a top portion (354) and a bottom portion (355). The bottom portion (355) of the foodstuff conduit (351) defines female end 355a and female end 355b.

The barrel (352) has a near end (357) and a far end (356). The near end (357) of the barrel (352) operably mates with female end 355a of the foodstuff conduit (351). The motor (353) operably mates with the female end 335b of foodstuff conduit (351) so as to rotate barrel (352).

According to an embodiment, the near end (357) of the barrel (352) defines a cutaway to form at a set of beater bars or fins (358, 359). In some embodiments, the barrel (352) may be replaced by an egg beater or whisk.

Foodstuff (23) is passed from the foodstuff conduit (351) through the barrel (352) onto the foodstuff conveyor belt (311). The fins (358, 359) prevent clumping of foodstuff (23) by separating the foodstuff as it is associated with the foodstuff conveyor belt (311).

According to an embodiment, the foodstuff (23) delivered from the container (350) to the foodstuff conveyor belt (311) may be onions, peppers, olives, amongst others. According to an embodiment, a plurality containers (350) maybe operably associated with the foodstuff conveyor belt (311). Referring to FIG. 1B, for exemplary purposes, this is called the granular delivery system (800) below.

Figure 14:
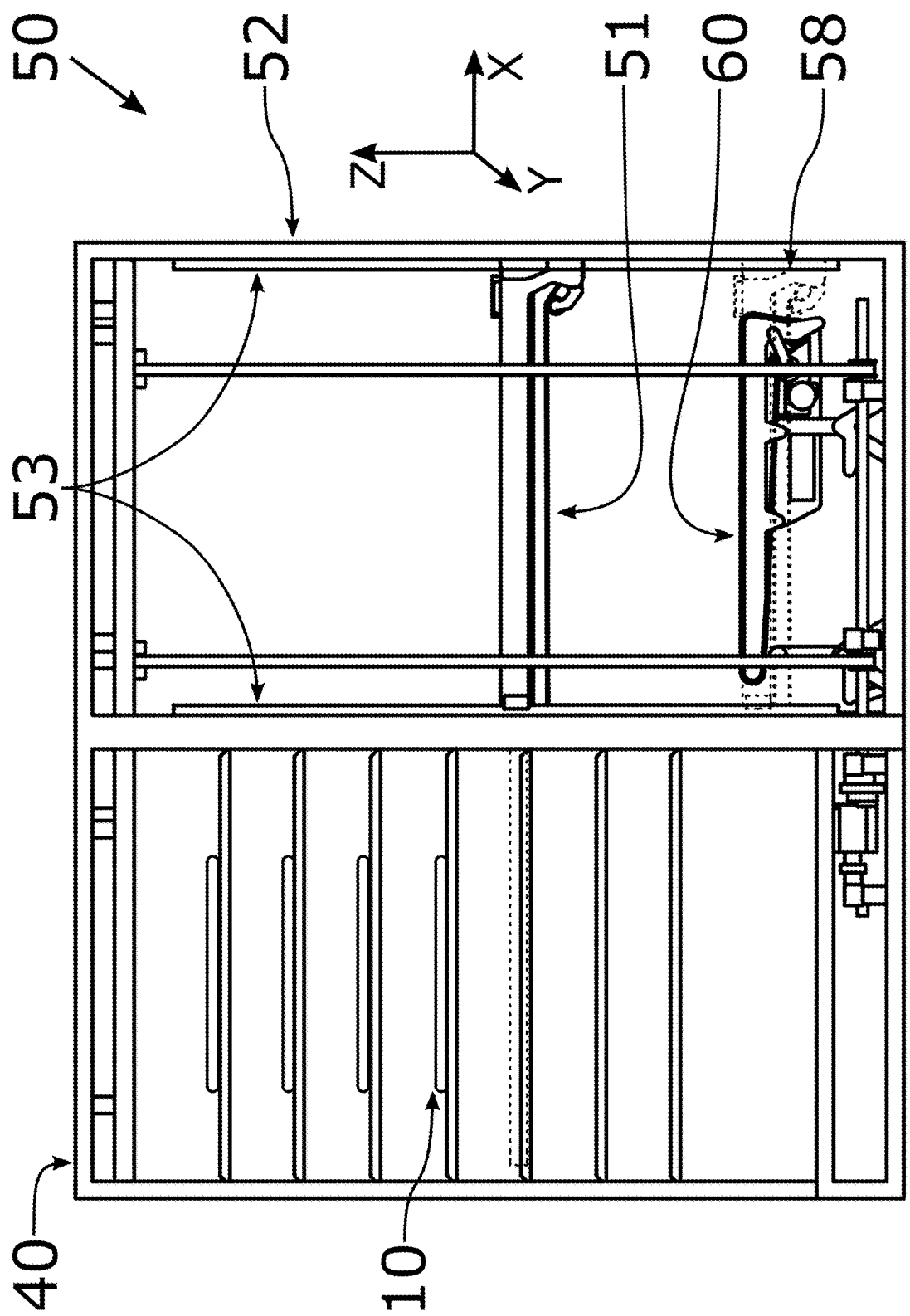
FIG. 14 is a side view of an embodiment of the handler.

Referring to FIGS. 1A and 14, in an embodiment, the self-contained apparatus to associate foodstuff and/or liquid with a base (100) is further comprised of base handler (50).

In an embodiment, a base (10) is removed from a storage location (40) and placed onto the main conveyor belt system (20) by a base handler (50).

In an embodiment, the base handler (50) is comprised of a panel (51) which is operably connected to a motorized pulley system (58) that allows the panel (51) to move along the x-, y- and z-axis. In an embodiment, the panel (51) is operably attached to a frame (52) which provides tracks (53) on which the panel (51) may move; whereby the frame (52) supports panel (51). The panel (51) moves along the frame (52) in the x-, y-, or z-axis, utilizing the motorized, pulley system (58).

Accordingly, the panel (51) moves along the z-axis, supported by the frame (52), to a position along the storage location (40) that holds a base (10); panel (51) then moves along the x-axis, outside of frame (52), to receive the base (10); panel (51) and base (10) move in the x-axis back into frame (52); next, the panel moves along the z-axis within the frame (52) to the transfer height; and, finally, the panel (51) moves along the x-axis (60), inside the frame, to deliver the base (10) to the main conveyor belt system (20). In another embodiment, the panel (51) may move along the y-axis so as to receive a base (10) at an additional column or set of storage locations adjacent to the original storage location (40).

In another embodiment, the handler (50) is further comprised of a conveyor belt (60). Accordingly, a base (10) is received from its storage location, as described above, then the panel (51) may move along the z-axis to associate the base (10) with conveyor belt (60). According to an embodiment, conveyor belt (60) moves the base to the main conveyor belt system (20).

In an exemplary sequence of events, a base (10) is convey to at least one: liquid distribution station where at least one layer of liquid is associated with the base (10); foodstuff distribution station (300) where foodstuff is associated with the base (10); or a combination thereof.

Referring to FIG. 1B, in an exemplary sequence of events, a base (10), pizza dough, is conveyed to a liquid distribution station (200) where at least one layer of pizza sauce is applied to the pizza dough (10). The pizza dough (10) may be raw, baked, or par-baked. The pizza dough maybe formed as any shape or unformed. The pizza dough (10) then passes through the cheese distribution station (600) which deposits cheese onto the base (10). In a preferred embodiment, at the cheese distribution station (600) cheese is grated, sliced, cut, or otherwise sectioned before the cheese is associated with the pizza dough (10). However, if the cheese is pre-shredded, sliced, or otherwise cut, the cheese maybe delivered to the pizza dough (10) at the granular foodstuff distribution station (800) below.

The pizza dough (10) then proceeds to the meat distribution station (700) where meat is associated with the pizza dough (10). In a preferred embodiment, the meat distribution station (700) slices, cuts, or otherwise sections meat before the meat is deposited onto the pizza dough (10a). Subsequently, the pizza dough (10) passes through granular food distribution station (800). Foodstuffs like olives, green peppers, onions, artichoke hearts, cheese, amongst others, are associated with the pizza dough (10). In an embodiment, the pizza dough (10) with associated foodstuff and sauce is then conveyed to an oven or other heat source for cooking.

Referring to FIG. 15, in an exemplary embodiment, functions of the apparatus for a self-contained system to associate foodstuff and/or liquid with a base (100) communicates with software (900) that controls metering of liquid and/or foodstuff, recipe management, amongst others.

According to an embodiment, the apparatus for a self-contained system to associate foodstuff and/or liquid with a base (100) is comprised of at least a liquid distribution station (200) and a foodstuff distribution station (300). According to an embodiment, the apparatus (100) communicates with software (900) where the software (900) is computer numerical control system. In some embodiments, each station (200, 300) is independently controlled by a separate computer numerical control system. In some embodiments, the computer numerical control system may send each station (200, 300) a system objective, operation instructions, core instructions, or specific instructions to each station (200, 300).

In an embodiment, the apparatus for a self-contained system to associate foodstuff and/or liquid with a base (10) communicates with software that receives an order (910) from a user to associate foodstuff and/or liquid with a base (100). According to an embodiment, when an order is communicated with the apparatus (100), it associates the requested foodstuff and/or liquid with a base (10). In an embodiment, a user (920) receives a base with associated foodstuff and/or liquid.

Referring to FIG. 16, according to an embodiment, the apparatus for a self-contained system to associate of foodstuff and/or liquid with a base (100) is operably associated with a vehicle (70). According to an embodiment, the associated foodstuff and/or liquid is delivered to the user just as the apparatus (100) has completed associating foodstuff and/or liquid with a base (10). According to an embodiment, the apparatus (100), the base (10) and the associated foodstuff and/or liquid are cooked in the vehicle before delivery.

As will be appreciated by one skilled in the art, aspects of the software may be embodied as a system, method, or computer product. Accordingly, aspects of the software may take the form of an entirely hardware embodiment, entirely software embodiment (including firmware, resident software, micro-code, etc.), or an embodiment combining software and hardware aspects. Further aspects of the software may take the form of a computer program embodied in one or more readable medium having computer readable program code/instructions thereon. Program code embodied on computer-readable medium may be transmitted using any appropriate medium, including but not limited to wireless, wireline, optical fiber cable, RF, etc., or any suitable combination of the foregoing. The computer code may be executed entirely on a user's computer; partly on the user's computer; as a standalone software package; a cloud service; partly on the user's computer and partly on a remote computer; or entirely on a remote computer, remote or cloud-based server.

We claim as our invention:

1. An apparatus to deliver foodstuff to a base comprising: a foodstuff conveyor belt system having at least one foodstuff conveyor belt, wherein the foodstuff conveyor belt delivers foodstuff to the base as it passes under the foodstuff conveyor belt system; wherein, the foodstuff conveyor belt rotates around at least one foodstuff conveyor belt pulley; a carriage where, the movement of the carriage is controlled by a carriage pulley where, the carriage pulley allows the carriage to move from a first location to a second location and from the second location to the first location; where, the foodstuff conveyor belt is mechanically attached to the carriage so that when the carriage moves from a first location to a second location the foodstuff conveyor belt moves from the first location to the second location while continuing to rotate around the foodstuff conveyor belt pulley wherein as the carriage moves from the second location to the first location, the foodstuff conveyor belt is locked so that it no longer rotates around the foodstuff conveyor belt pulley and the carriage pulley continues to rotate so that foodstuff on the foodstuff conveyor belt is delivered to the base.

2. The apparatus of claim 1 wherein, the apparatus is attached to a shredder.

3. The apparatus of claim 1 wherein, the apparatus is attached to or near a slicer.

4. The apparatus of claim 1 wherein, the apparatus is attached to a foodstuff container.

5. The apparatus of claim 1 where the base is taken from the group consisting of: bowl, cooked pizza dough, uncooked pizza dough, par-cooked pizza dough, bread, cake, cookie.

6. The apparatus of claim 1 is located on a vehicle.

* * * * *